United States Patent

Ashikawa et al.

[15] 3,700,083
[45] Oct. 24, 1972

[54] SYNCHROMESH TRANSMISSION APPARATUS

[72] Inventors: Noboru Ashikawa, Kawagoe; Fujiya Maruno, Tokyo, both of Japan

[73] Assignee: Honda Giken Kogyo Kabushiki Kaisha, Tokyo, Japan

[22] Filed: Dec. 24, 1970

[21] Appl. No.: 101,223

[30] Foreign Application Priority Data

Dec. 29, 1969 Japan ........................ 45/1218

[52] U.S. Cl. .............................................. 192/53 F
[51] Int. Cl. ............................................. F16d 23/06
[58] Field of Search ................................... 192/53 F

[56] References Cited

UNITED STATES PATENTS 3,270,843   9/1966   Ivanchich ................. 192/53 F
2,328,205   8/1943   Flinn ........................ 192/53 F

*Primary Examiner*—Allan D. Herrmann
*Attorney*—Waters, Roditi, Schwartz & Nissen

[57] ABSTRACT

A synchromesh transmission comprises a resilient ring interposed between a sleeve mounted for axial slidable movement on a hub on a main shaft and a blocking ring provided on the outside of the sleeve. The resilient ring is arranged so that at the time of displacement of the sleeve, the resilient ring is initially pushed laterally by the sleeve so as to push the blocking ring and then the resilient ring is compressed and deflected radially by the sleeve so as to allow the sleeve to pass thereover and engage a drive gear loosely mounted on the main shaft.

10 Claims, 6 Drawing Figures

}

INVENTOR
Noboru Ashikawa
Fujiya Maruno

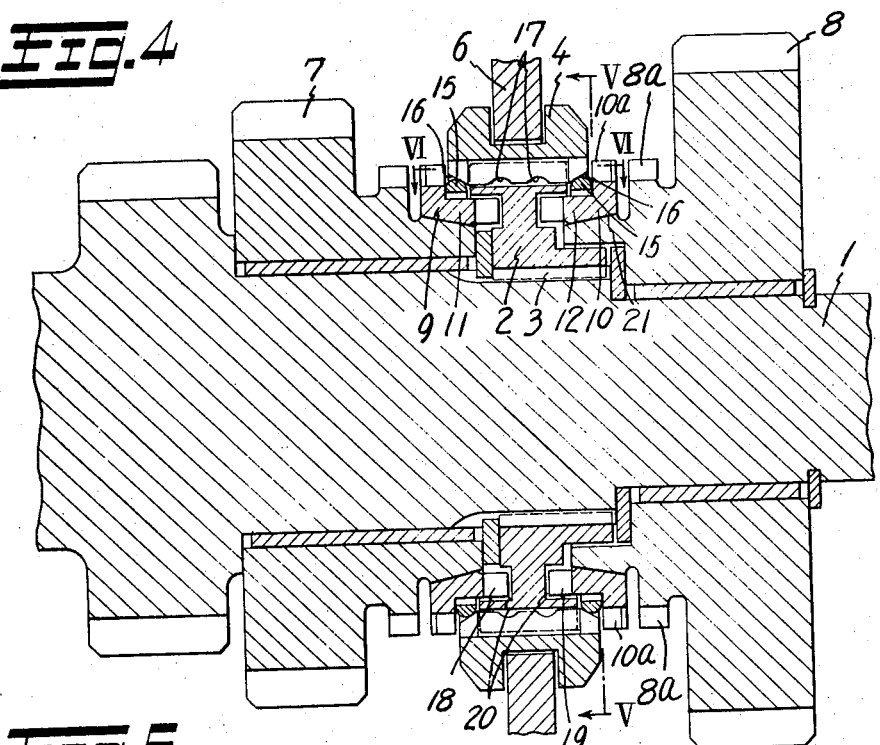
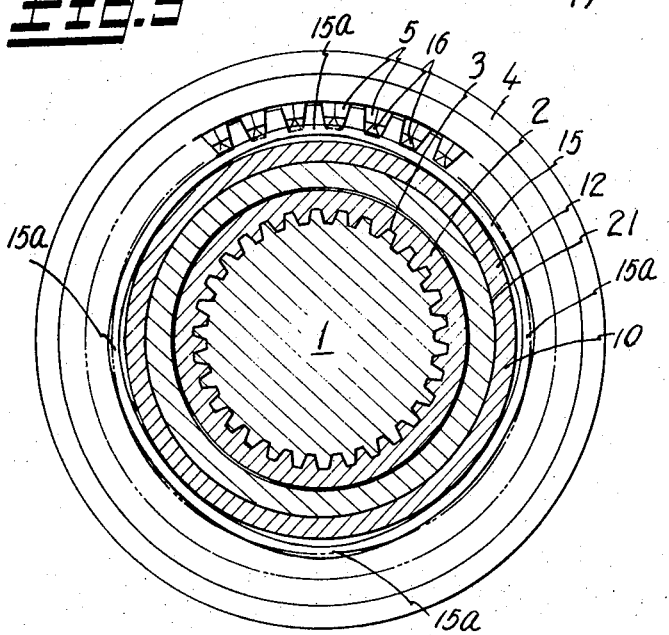
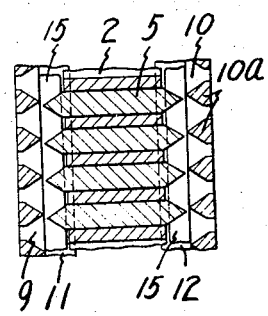

SYNCHROMESH TRANSMISSION APPARATUS

BRIEF SUMMARY OF THE INVENTION

The invention relates to improvements in synchromesh transmissions.

An object of this invention is to provide a synchromesh type transmission which is small in size and of simplified construction.

For accomplishing this object, the invention contemplates a construction which comprises a resilient ring interposed between a sleeve slidably mounted on a hub on a main shaft and a blocking ring provided on the outside of the sleeve, the resilient ring being so arranged that upon movement of the sleeve, the resilient ring is first pushed laterally by the sleeve so as to push the blocking ring and is then compressed and deflected radially by the sleeve so as to allow the sleeve to pass thereover.

The resilient ring may be either a perfect circular ring or a deformed circular ring. In the case of the perfect circular ring, projections are respectively provided on the inner surface of the sleeve and the outer surface of a boss integrally extending from the blocking ring, and the resilient ring is interposed therebetween. In the case of the deformed circular ring, no projections are provided on the boss, and the resilient ring is mounted directly on the outer surface of the boss.

The sleeve is preferably provided with an annular groove at its middle portion of the inner surface thereof, so that when the shift operation has been completed the resilient ring is received in the groove.

BRIEF DESCRIPTION OF THE DRAWING:

FIG. 4 is a side view in cross-section of another embodiment of transmission according to this invention, FIG. 5 is a section view taken along line V—V in FIG. 4, and FIG. 6 is a sectional view taken along line VI—VI in FIG. 4.

DETAILED DESCRIPTION

Figure 1:
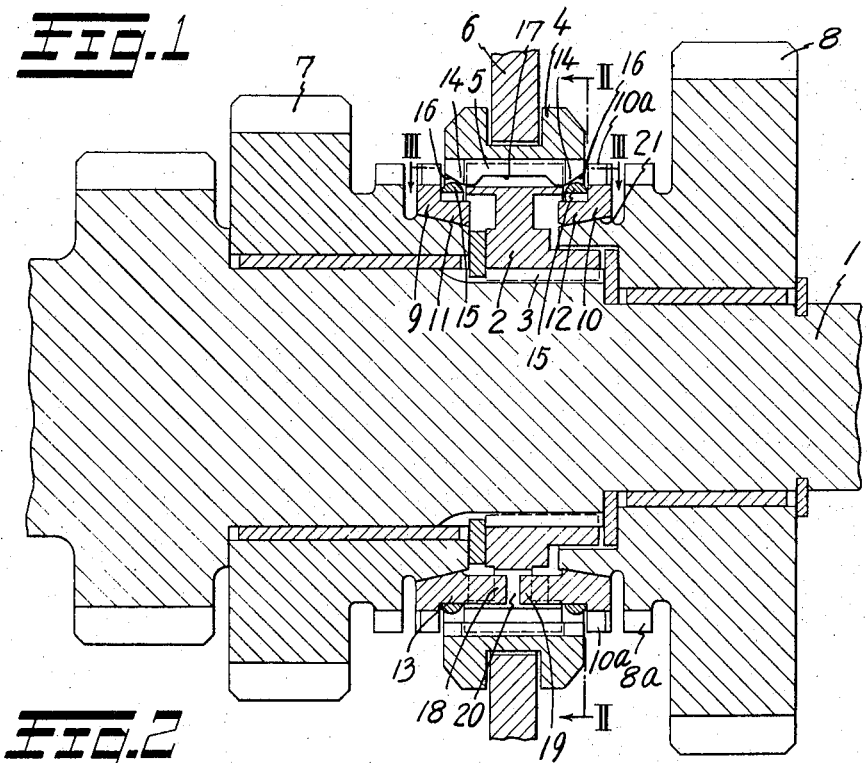
FIG. 1 is a side view in cross-section of one embodiment of transmission according to this invention.
Figure 2:
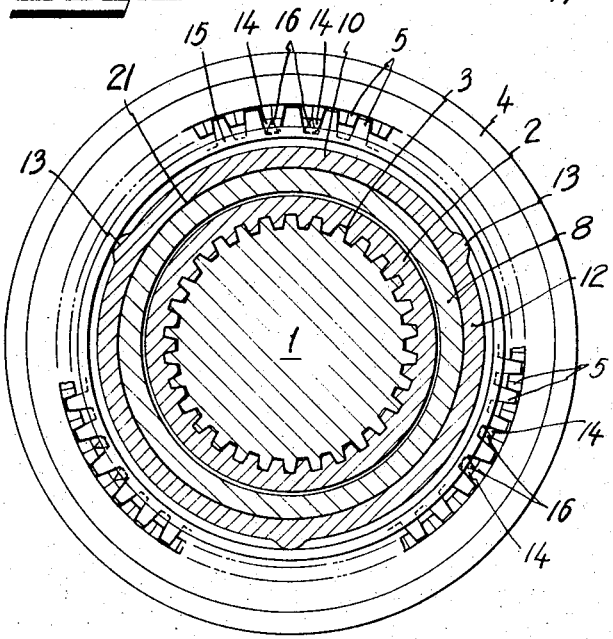
FIG. 2 is a sectional view taken along line II—II in FIG. 1.
Figure 3:
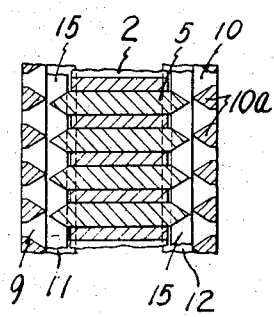
FIG. 3 is a sectional view taken along line III—III in FIG. 1.

Referring to FIGS. 1 to 3 showing one embodiment of a transmission according to this invention, numeral 1 denotes a main drive shaft, numeral 2 denotes a hub integrally connected to the main shaft 1 through a spline 3 or the like, numeral 4 denotes a sleeve mounted on the hub 2 through a spline 5 so as to be axially slidable, numeral 6 denotes an actuator for operating the sleeve 4, numerals 7 and 8 denote driven gears loosely mounted on shaft 1 for rotation, and numerals 9 and 10 denote blocking rings slidably and rotatably mounted on gears 7 and 8.

The blocking rings 9 and 10 have bosses 11 and 12 extending integrally therefrom into lateral recesses in the spline 5 of the sleeve 4, and projecting portions 13 and 14 are respectively provided on the outer surface of each of the bosses 11 and 12 and the inner surface of each end of the spline 5. A circular resilient ring 15 is mounted on the outer surface of each of the bosses 11 and 12 so as to be supported by the projecting portions 13 on the bosses, and the projecting portions 14 of the sleeve 4. The projecting portions 14 are formed as longer teeth which are a part of the teeth of the spline 5 and constructed with end surface beveled portions 16 which face the side surfaces of the resilient rings 15.

When the sleeve 4 is located at the illustrated neutral position, the circular resilient rings 15 each remains in perfect circular form and the inner surfaces thereof are in light contact with the projecting portions 13 on the bosses 11 and 12. If the sleeve 4 is shifted, for example, to the right in FIG. 1, the inclined surface of the beveled portion 16 of the projecting portions 14 on the inner surface of the sleeve 4 pushes the resilient ring 15 laterally and brings the same into pressure contact with the projecting portions 13 of the blocking ring 10, so that the blocking ring 10 is brought into frictional engagement with the gear 8 through a clutch 21 consisting of conical slidable surfaces on the boss 10 and the gear 8. By further movement of the sleeve 4 to the right, the inclined surface of the beveled portion 16 of the projecting portions 14 compresses and deflects the corresponding portion of the resilient ring 15 in the radial direction thereof, so that the ring 15 allows the sleeve 4 to pass thereover. By further movement of the sleeve 4 to the right, the spline 5 of the sleeve 4 strikes against a spline 10a on the outer surface of the blocking ring 10, so that the blocking ring 10 is pushed further to the right and the friction of the clutch 21 is increased, whereby the rotation speeds of the sleeve 4 and the gear 8 become equal. Then, the sleeve 4 is meshed with the spline 8a of the gear 8 while pushing the spline 10a of the blocking ring 10 aside and thus the rotation of the main shaft 1 is transmitted to the gear 8. Numeral 17 denotes an escape groove in the inner surface of the spline 5 for the ring 15 so that the shift movement of the sleeve 4 after synchronization can be effected without resistance. Numerals 18 and 19 denote projections provided on the blocking rings 9 and 10, and the projections 18 and 19 are loosely mounted in an opening 20 of the hub 2 so that the blocking rings 9 and 10 are each allowed to rotate within the range (a half pitch of the spline) between a position where the meshing thereof with the sleeve 4 is blocked and a position where the meshing is allowed.

FIGS. 4 to 6 show another embodiment of this invention, wherein the foregoing projecting portions 13 and 14 are omitted and each resilient ring 15 is deformed from its circular outline so as to be provided with arched projections 15a at several equally spaced locations on the circumference of the ring (see FIG. 5). When, in this embodiment, the sleeve 4 is located at the illustrated neutral position, the resilient rings 15 each remains in its natural free-form position and the inner surfaces thereof are at equally spaced internal portions in light contact with the outer surfaces of the bosses 11 and 12, respectively. If the sleeve 4 is shifted, for example, to the right in FIG. 4, the inclined surface of the beveled portion 16 strikes against the projecting portions 15a of the resilient ring to push the ring 15 to the right and the ring 15 is brought into frictional engagement with the gear 8 through clutch 21. If the sleeve 4 is further shifted to the right, the beveled portion 16 presses and deflects the projecting portions 15a of the ring 15 inwards, so that the resilient ring 15 becomes nearly perfectly circular and allows the sleeve 4 to pass over the ring. Thereafter, in almost the same manner as in the foregoing embodiment, the sleeve 4 first pushes against the blocking ring 10 and displaces the same laterally and then meshes with the spline 8a of the gear 8. During the power transmission operation, the resilient ring 15 becomes positioned within the escape groove 17 in the inner surface of the spline 5 and is restored to its free form.

According to the invention, at the time of the shift operation of the sleeve, the resilient ring is initially pushed laterally and then is pushed and deflected radially to allow the sleeve to pass thereover, so that synchromeshing can be effected smoothly and accurately. Additionally, the number of parts and the number of manufacturing steps is lessened in comparison with the conventional transmissions and, thus, the construction is simplified.

What is claimed is:

1. In a synchromesh transmission having a drive shaft with at least one gear loosely mounted on the shaft, and a sleeve coupled in rotation on the shaft and slidable thereon to an operative position for engaging the gear to couple the gear in rotation with the shaft, an improvement comprising a blocking ring coupled to said drive shaft for rotation therewith, resilient means comprising a resilient ring between said sleeve and blocking ring to press said blocking ring against the gear and couple the same in rotation when the sleeve is initially displaced towards said operative position, said resilient ring being deformed as the sleeve advances further to said operative position to permit said sleeve to advance therepast and engage the now rotating gear, and projections on said sleeve having inclined surfaces facing said blocking ring and positioned to contact said resilient ring and pass thereon as the sleeve is advanced to engage the gear, and projections on said blocking ring spaced therearound and supporting the resilient ring in opposition to said projections on the sleeve.

2. An improvement as claimed in claim 1 comprising a boss integrally formed on said blocking ring and facing said sleeve, said projections on said ring being on said boss.

3. An improvement as claimed in claim 2 wherein said sleeve has an escape groove for receiving said resilient ring after passage of said inclined surfaces on the resilient ring.

4. An improvement as claimed in claim 1 comprising means between said drive shaft and said blocking ring permitting limited angular movement therebetween to enable meshing of the sleeve and the blocking ring.

5. An improvement as claimed in claim 1 wherein said blocking ring and gear are slidable on respective conical surfaces which are inclined with respect to the direction of displacement of the sleeve.

6. An improvement as claimed in claim 1 comprising a second blocking ring and gear, said sleeve being between said gears to selectively engage either thereof.

7. In a synchromesh transmission having a drive shaft with at least one gear loosely mounted on the shaft, and a sleeve coupled in rotation on the shaft and slidable thereon to an operative position for engaging the gear to couple the gear in rotation with the shaft, an improvement comprising a blocking ring coupled to said drive shaft for rotation therewith, resilient means comprising a resilient ring between said sleeve and blocking ring to press said blocking ring against the gear and couple the same in rotation when the sleeve is initially displaced towards said operative position, said resilient ring being deformed as the sleeve advances further to said operative position to permit said sleeve to advance therepast and engage the now rotating gear, and projections on said sleeve having inclined surfaces facing said blocking ring and positioned to contact said resilient ring and pass thereon as the sleeve is advanced to engage the gear, said resilient ring being of deformed circular form and including spaced projecting portions facing said projections on the sleeve.

8. An improvement as claimed in claim 7 comprising means between said drive shaft and said blocking ring permitting limited angular movement therebetween to enable meshing of the sleeve and the blocking ring.

9. An improvement as claimed in claim 7 wherein said blocking ring and gear are slidable on respective conical surfaces which are inclined with respect to the direction of displacement of the sleeve.

10. An improvement as claimed in claim 7 comprising a second blocking ring and gear, said sleeve being between said gears to selectively engage either thereof.

* * * * *